United States Patent [19]

Bergman et al.

[11] 4,157,841
[45] * Jun. 12, 1979

[54] SAFETY BELT CONNECTOR COVER

[75] Inventors: Kenneth A. Bergman, Utica, Mich.; Robert J. Bishop, Pendleton, N.Y.

[73] Assignee: Allied Chemical Corporation, Morris Township, Morris County, N.J.

[*] Notice: The portion of the term of this patent subsequent to Jan. 24, 1995, has been disclaimed.

[21] Appl. No.: 824,589

[22] Filed: Aug. 15, 1977

Related U.S. Application Data

[63] Continuation-in-part of Ser. No. 654,481, Feb. 2, 1976, Pat. No. 4,070,038.

[51] Int. Cl.² .............................................. B60R 21/10
[52] U.S. Cl. ...................................... 297/482; 280/801
[58] Field of Search ...................... 280/744, 751, 752; 428/157, 67, 76, 159; 29/460

[56] References Cited

U.S. PATENT DOCUMENTS

| | | | |
|---|---|---|---|
| 3,446,361 | 5/1969 | Douty | 29/460 |
| 3,964,578 | 6/1976 | Campbell et al. | 280/752 |

Primary Examiner—Robert R. Song
Attorney, Agent, or Firm—Roger H. Criss; Ernest D. Buff

[57] ABSTRACT

A safety belt connector having an elongated means composed of a metal plate is provided with a plastic cover. The cover is formed around a major portion of the exterior surface of the elongated means preventing temperature variance thereon and presenting an attractive exterior for the connector.

21 Claims, 4 Drawing Figures

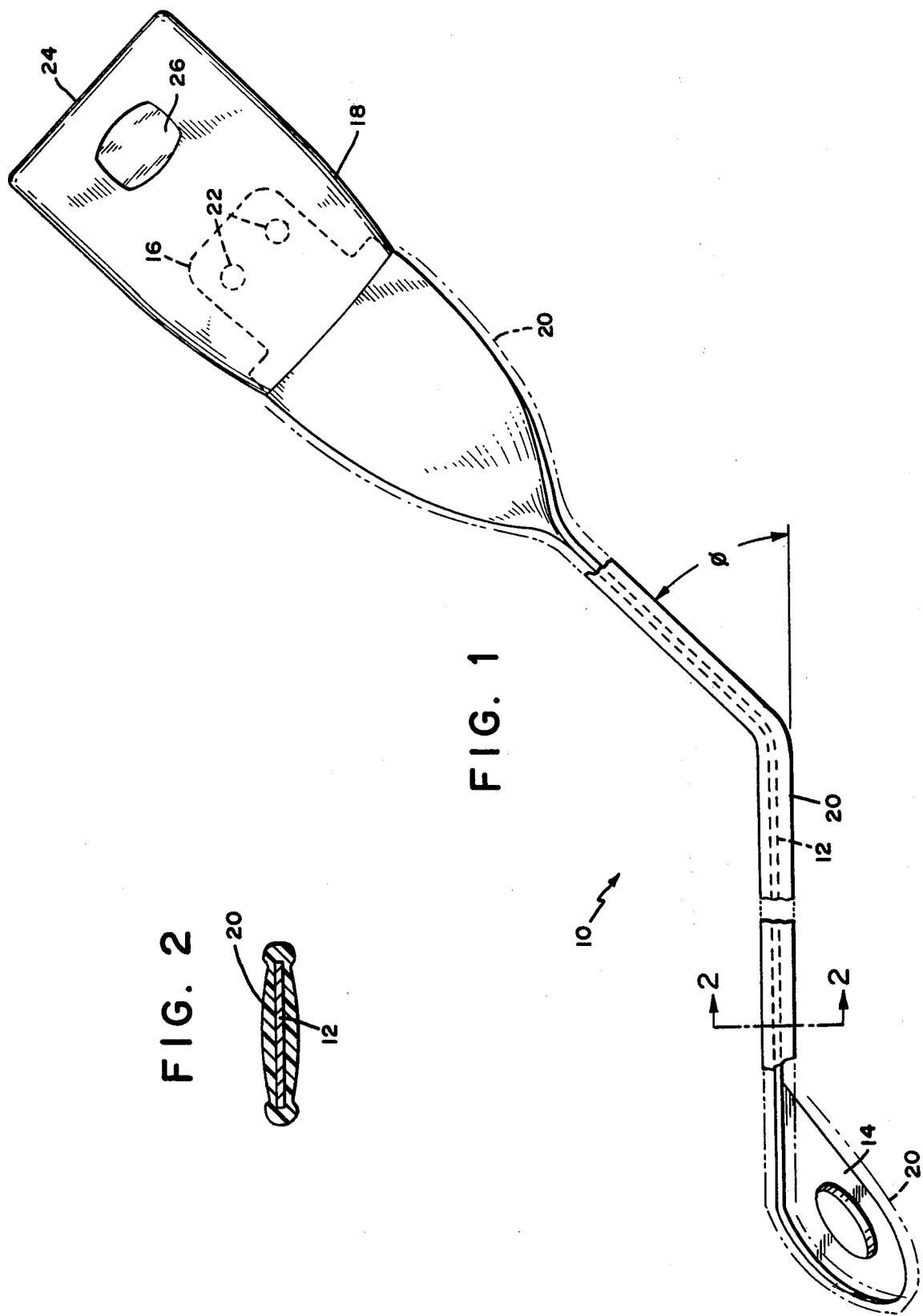

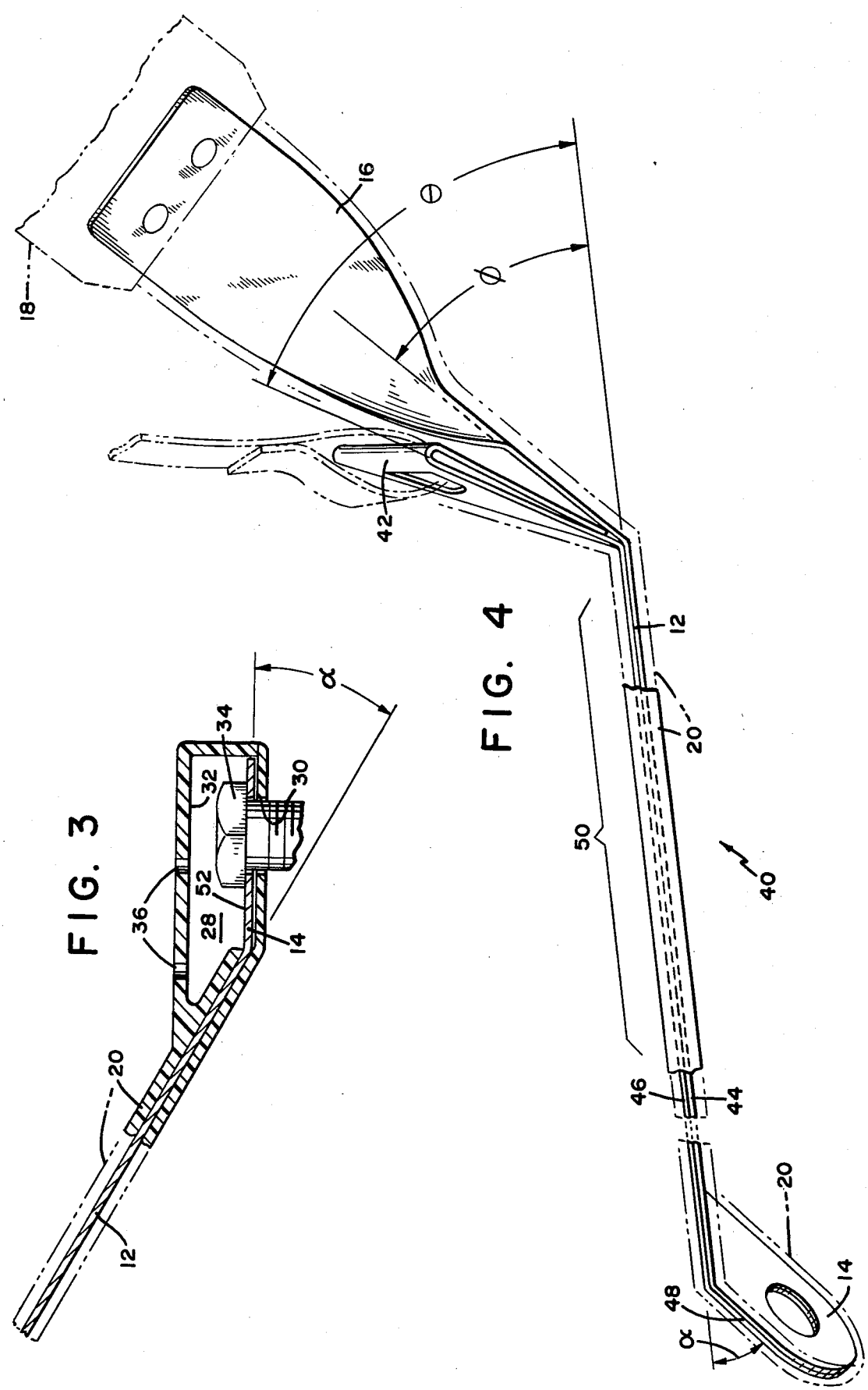

4,157,841

SAFETY BELT CONNECTOR COVER

CROSS-REFERENCE TO RELATED APPLICATIONS

This application is a continuation-in-part of copending application Ser. No. 654,481, filed Feb. 2, 1976, entitled "Safety Belt Connector Cover", now U.S. Pat. No. 4,070,038.

BACKGROUND OF THE INVENTION

1. Field of the Invention

This invention relates to accessories for safety belts in motor vehicles, such as automobiles, and more particularly to a cover for the connector anchoring a lock-carrying part of the belt to the vehicle floor.

2. Description of the Prior Art

Safety belt systems have been developed in order to reduce the number of fatalities and serious injuries resulting from motor vehicle accidents. Most of these systems include a belt connector having one end anchored to the vehicle floor and the other end provided with a buckle adapted to coact with the tongue of a seat belt assembly similarly secured to the vehicle. The connector generally comprises a plastic boot housing a webbing joining the buckle to an anchor on the vehicle floor. Such connectors are costly to form and assemble. In addition, they are large, bulky structures that decrease the seating space available for vehicle passengers. Connectors constructed of cable or metal strips have been proposed. Such metal connectors are uncomfortably cold in the winter and dangerously hot in the summer. They are aesthetically unattractive, and provide relatively hard objects within the vehicle passenger compartment that can tear packages, rip clothes and injure occupants present therein. As a result, safety belt connectors of the type described involve problems of cost, comfort, configuration and safety which have not yet been overcome.

SUMMARY OF THE INVENTION

The present invention provides a safety belt connector that is smaller, aesthetically more attractive, less expensive to manufacture, more comfortable to wear and safer to use than safety belt connectors of the type disclosed above. The connector has an elongated means composed of a metal plate. A first terminus of the elongated means is adapted to be secured to the vehicle. The elongated means has a second terminus adapted to fixedly support a first fastening means for receiving the tongue of a seat belt. A cover means composed of plastic material is formed around a major portion of the elongated means.

The safety belt connector of this invention has advantageous structural features. The metal plate is less expensive to fabricate and both smaller and stronger than boot-packaged web-anchor assemblies. Problems of temperature fluctuation presented by metal connectors are eliminated. An aesthetically attractive, relatively soft plastic cover decreases temperature variance on the exterior surface of the connector and prevents torn packages, ripped clothes and injuries to vehicle occupants. As a result, the safety belt connector of this invention is far more attractive in terms of its size, cost, comfort, safety and appearance than previous safety belt connectors.

BRIEF DESCRIPTION OF THE DRAWINGS

The invention will be more fully understood and further advantages will become apparent when reference is made to the following detailed description and the accompanying drawings in which:

FIG. 1 is a side view, partly broken away of a safety belt connector;

FIG. 2 is a section taken through line 2—2 of FIG. 1;

FIG. 3 is a side view partly in section of a safety belt connector, the section showing a chamber adapted to cover an end thereof;

FIG. 4 is a side view, partly broken away of an alternate embodiment of the safety belt connector shown in FIG. 1.

DESCRIPTION OF THE PREFERRED EMBODIMENTS

Referring to FIGS. 1 and 2 of the drawings, there is illustrated a preferred form of safety belt connector incorporating the present invention. Other forms of safety belt connectors can also be used, the safety belt connector, shown generally at 10, should therefore be interpreted as illustrative and not in a limiting sense. As illustrated, the safety belt connector 10 has an elongated means 12 composed of a metal plate. A first terminus 14 of the elongated means 12 is adapted to be secured to the vehicle (not shown). The elongated means 12 has a second terminus 16 adapted to fixedly support a first fastening means 18 for receiving the tongue of a seat belt (not shown). A cover means 20 composed of plastic material is formed around a major portion of the exterior surface of the elongated means 12.

The safety belt connector 10 is generally disposed in the vehicle with first terminus 14 secured to the vehicle floor by suitable mechanical fasteners such as bolts or the like. Elongated means 12 extends in an upward-forward direction from the vehicle floor, the extension being a sufficient length that the second terminus 16 is located slightly above the bottom portion of the front seat. The first fastening means 18 is fixedly mounted on the second terminus 16 by rivets 22 or the like. Such fastening means 18 can be a buckle mechanism of conventional construction and is generally comprised of a housing having an opening 24 into which a coupling member such as a tongue (not shown), fixed to a seat belt anchored to the vehicle is adapted to be inserted. Insertion of the coupling member automatically effects locking engagement between the coupling member and the fastening means 18. A release mechanism (not shown) is provided in the first fastening means 18 so that the connection can be quickly released by pushing a button 26 or other suitable means. Alternatively, the first fastening means 18 can comprise a seat belt tongue adapted to engage a buckle mechanism, the buckle mechanism to be attached to the seat belt.

Elongated means 12 is adapted to be routed between the bottom and back portions of a bench-type seat so that the first fastening means 18 extends to the side of a vehicle occupant. The seat belt has sufficient length to extend about the occupant's waist and into locking engagement with the first fastening means 18. Although the seat belt can be a single strap adapted to be connected across the occupant's waist, it may also include a shoulder harness strap having one end anchored to the vehicle and the other end secured to the coupling member.

The cover means 20 can be any plastic material which is substantially non-flammable and will adhere to the surface of the elongated means 12 so as to provide a continuous protective covering having a thickness of at least about 30 mils and preferably about 30 to 100 mils, and a hardness of less than 100 Shore A Durometer. As used in this paragraph and elsewhere in the specification and claims the term "cover means" is intended to mean plastic material formed around the elongated means in continuous contact therewith and having the aforesaid thickness and hardness characteristics. Numerous thermoplsatic and thermosetting resins having these characteristics are suitable. Typical plastic materials from which the cover means can be formed include nylon resins, acrylic resins, polyacrylates, polyolefins, polysulfones, polycarbonates, fluoropolymers, polyesters, polybutylene terephthalate, polyvinylchloride, polyvinylidene chloride and the like.

As shown in FIG. 3, the portion of elongated means 12 covered by cover means 20 can include the first terminus 14. In the embodiment shown, the cover means includes, an integral part thereof, a chamber 28 having an open bottom 30 and a closed top 32. Mechanical fastener 34, securing first terminus 14 to the vehicle floor (not shown) extends through the open bottom 30 and into chamber 28. The latter provides the first terminus 14 and the fastener 34 with a protective covering which is aesthetically attractive and shields vehicle occupants from temperature fluctuations on the exterior surface of the fastener 34, including fluctuations provided by catalytic convertors of vehicle emission control systems, changing climatic conditions and the like. Chamber 28 can be provided with a plurality of apertures as in the order of about 2 to 8 apertures each having a cross-sectional area of about 0.01 to 0.10 suare inch. These apertures minimize temperature differential between the interior of the chamber 28 and the vehicle passenger compartment.

In FIG. 4 there is illustrated a safety belt connector adapted to service simultaneously a plurality of vehicle occupants. The safety belt connector, shown generally at 40, has, in addition to the components described above in connection with FIGS. 1-2, an elongated means including a third terminus 42 adapted for fixed engagement with one end of a seat belt web (not shown). The seat belt web is adapted to be connected across the waist of a vehicle occupant seated adjacent to an occupant being serviced by the fastening means 18 (shown in phantom) associated with second terminus 16. The other end of the seat belt web is connected to a seat belt buckle adapted to mate with a coupling member such as the tongue of a second web anchored to the vehicle. Alternatively, the other end of the seat belt web can be connected to a coupling member, such as a tongue, adapted to mate with a seat belt buckle fixedly secured to the vehicle via safety belt connector of the type previously described in connection with FIGS. 1 and 2.

The safety belt connector 40 preferably includes a plurality of metal plates 44, 46. Plate 44 has a first terminus 14 and a second terminus 16 of the type described in connection with FIGS. 1 and 2. Plate 46 provides the third terminus 42 and, in addition, a fourth terminus 48 adapted to be secured to the vehicle in the same manner as the first terminus 14. Elongated means 12 has a central portion 50 connecting first terminus 14 and fourth terminus 48 with second terminus 16 and third terminus 42. The second terminus 16 is disposed at an angle from the central portion 50, the angle, $\phi$, ranging from about 30° to 80°. Third terminus 42 is similarly disposed at the angle $\theta$ of about 40° to 90° from central portion 50. The angular disposition, $\alpha$, between central portion 50 and each of first terminus 14 and fourth terminus 48 can range from about 10° to 30°. Each of metal plates 44, 46 can be die stamped fom cold rolled plain carbon steel having an ultimate tensile strength of about 80,000–120,000 pounds and an ultimate elongation of at least about 5 percent.

Cover means 20 is disposed about a major portion of the exterior surface of elongated means 12, as in the order of about 50 to 100 percent of the surface area thereof. Preferably, the cover means is disposed about and adheres to substantially the entire surface area of the elongated means 12. The cover means 20 can be applied to the elongated means 12 by spraying, dipping or painting. In dipping the elongated means 12, an insert is temporarily connected to surface 52 of first terminus 14. Upon hardening of the plastic cover 20 the insert is removed to produce the hollow portion of the chamber 28. The cover means 20 can also be formed around a major portion of the exterior surface of elongated means 12 by an insert molding operation or by a combination of insert molding with the aforementioned spraying, dipping and painting operations.

In operation, the safety belt connector 10 is secured to the vehicle with the fastening means 18 located at hip level of a vehicle occupant seated therein. At this level the coupling member of a vehicle anchored safety belt (not shown) located near the other hip of the occupant can be conveniently passed across the waist and/or chest thereof to lockingly engage fastening means 18. Such an embodiment enables the coupling member to be secured in the fastening means 18 with one hand.

Having thus described the invention in rather full detail, it will be understood that these details need not be strictly adhered to but that various changes and modifications may suggest themselves to one skilled in the art, all falling within the scope of the present invention as defined by the subjoined claims.

We claim:

1. Safety belt connector, comprising:
   a. elongated means composed of a metal plate;
   b. said elongated means having a first terminus adapted to be secured to the vehicle, a second terminus adapted to fixedly support a first fastening means for receiving the tongue of a seat belt and a third terminus adapted for fixed engagement with one end of a seat belt web and said other end of said web being connected to a member of a seat belt assembly; and
   c. cover means composed of plastic material formed around a major portion of the exterior surface of said elongated means.

2. Safety belt connector as recited in claim 1, wherein said plastic material is selected from the group consisting of polyvinylchloride, polyvinylidene chloride and polyolefin resins.

3. Safety belt connector as recited in claim 1, wherein the other end of said web is connected to a seat belt buckle.

4. Safety belt connector as recited in claim 1, wherein the other end of said web is connected to a seat belt tongue.

5. Safety belt connector as recited in claim 1, wherein said elongated means is composed of a plurality of plates, a first of said plates having said first terminus and said second terminus and a second of said plates supporting said third terminus, said second of said plates having a fourth terminus adapted to be secured to said vehicle.

6. Safety belt connector as recited in claim 1, wherein said elongated means has a central portion connecting said first terminus with said second terminus and said second terminus is disposed at an angle from said central portion, the angle ranging from about 30° to 80°.

7. Safety belt connector as recited in claim 5, wherein said elongated means has a central portion connecting said first terminus with said second terminus and said third terminus is disposed at an angle from said central portion, said angle ranging from about 40° to 90°.

8. Safety belt connector as recited in claim 1, wherein said first fastening means and said third terminus are adapted so that the seat belt associated with said first fastening means services a different occupant of the vehicle than the seat belt web associated with said third terminus.

9. Safety belt connector as recited in claim 1, wherein said first terminus is secured to said vehicle by a mechanical fastening means and said cover means includes as an integral part thereof a chamber having an open bottom and a closed top said chamber being adapted to cover each of said first terminus and said mechanical fastening means.

10. Safety belt connector as recited in claim 5, wherein each of said first terminus and said fourth terminus is secured to said vehicle by mechanical fastening means and said cover means includes as an integral part thereof a chamber having an open bottom and a closed top, said chamber being adapted to cover each of said first terminus, said fourth teminus and said mechanical fastening means.

11. Safety belt connector as recited in claim 9, wherein said chamber has a plurality of apertures therin.

12. Safety belt connector as recited in claim 11, wherein the number of apertures ranges from about 2 to 8, and the cross-sectional area of each of said apertures is about 0.01 to 0.1 square inch.

13. Safety belt connector as recited in claim 1, wherein said elongated means has a central portion connecting said first terminus with said second terminus and said first terminus is disposed at an angle from said central portion, said angle ranging from about 10° to 30°.

14. Safety belt connector as recited in claim 1, wherein said cover means is formed around substantially the entire exterior surface of said elongated means.

15. Safety belt connector as recited in claim 1, wherein said cover means has a thickness of at least about 30 mils.

16. Safety belt connector as recited in claim 1, wherein said cover has a hardness of less than about 100 Shore A Durometer.

17. Safety belt connector as recited in claim 1, wherein said cover means adheres to said exterior surface.

18. Safety belt connector as recited in claim 17, wherein said cover means is in continuous contact with said exterior surface.

19. Safety belt connector as recited in claim 1, wherein said cover means is formed around said exterior surface by an insert molding operation.

20. Safety belt connector as recited in claim 18, wherein said cover means is formed around substantially the entire exterior surface of said elongated means.

21. Safety belt connector, comprising:
 a. elongated means composed of a metal plate;
 b. said elongated means having a first terminus adapted to be secured to the vehicle by a mechanical fastening means and a second terminus adapted to fixedly support a first fastening means for receiving the tongue of a seat belt; and
 c. cover means composed of plastic material formed around a major portion of the exterior surface of said elongated means by an insert molding operation, said cover means including as an integral part thereof a chamber having an opened bottom and a closed top, said chamber being adapted to cover each of the first terminus and the mechanical fastening means.

* * * * *